(12) United States Patent
Ikeguchi et al.

(10) Patent No.: US 11,536,161 B2
(45) Date of Patent: Dec. 27, 2022

(54) GAS TURBINE ENGINE

(71) Applicant: KAWASAKI JUKOGYO KABUSHIKI KAISHA, Kobe (JP)

(72) Inventors: Takuya Ikeguchi, Kobe (JP); Koji Terauchi, Kobe (JP); Mitsuaki Tanaka, Kobe (JP); Hidenori Arisawa, Kobe (JP); Yuji Shinoda, Akashi (JP); Yoshiyuki Noguchi, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 592 days.

(21) Appl. No.: 16/715,376

(22) Filed: Dec. 16, 2019

(65) Prior Publication Data

US 2020/0141281 A1    May 7, 2020

Related U.S. Application Data

(63) Continuation of application No. PCT/JP2018/022457, filed on Jun. 12, 2018.

(30) Foreign Application Priority Data

Jun. 19, 2017   (JP) .............................. JP2017-119377

(51) Int. Cl.
   *F01D 25/30*   (2006.01)
   *F02C 7/06*    (2006.01)
   (Continued)

(52) U.S. Cl.
   CPC ................ *F01D 25/30* (2013.01); *F02C 7/06* (2013.01); *F01D 9/02* (2013.01); *F01D 25/162* (2013.01);
   (Continued)

(58) Field of Classification Search
   CPC ........ F01D 9/02; F01D 25/162; F01D 25/166; F01D 25/168; F01D 25/18; F01D 25/183;
   (Continued)

(56) References Cited

U.S. PATENT DOCUMENTS

| | | | |
|---|---|---|---|
| 10,082,041 B2 | 9/2018 | Bei et al. | |
| 2014/0205447 A1* | 7/2014 | Patat | F01D 25/125 415/111 |
| 2017/0022843 A1 | 1/2017 | Tanimura et al. | |

FOREIGN PATENT DOCUMENTS

| | | |
|---|---|---|
| CA | 2 676 235 A1 | 1/2002 |
| GB | 1 531 705 A | 11/1978 |

(Continued)

*Primary Examiner* — Arun Goyal
(74) *Attorney, Agent, or Firm* — Sughrue Mion, PLLC (57) ABSTRACT

A gas turbine engine including: an exhaust diffuser including an inner tube and an outer tube that form therebetween an annular exhaust passage; a bearing chamber formed radially inside the inner tube for accommodating a bearing that supports a rotor of a turbine; a plurality of hollow struts extending across the exhaust passage; an oil introduction passage extending through one of the struts for introducing oil to be supplied to the bearing chamber; an oil drain passage extending through one of the struts for draining the oil from an exhaust oil inlet opened on a bottom surface of the bearing chamber; and an oil discharge passage for discharging a portion of the oil having passed through the oil introduction passage toward the oil drain inlet.

13 Claims, 8 Drawing Sheets

(51) Int. Cl.
  *F01D 9/02* (2006.01)
  *F01D 25/16* (2006.01)
  *F01D 25/18* (2006.01)
  *F02C 3/04* (2006.01)
(52) U.S. Cl.
  CPC .......... *F01D 25/166* (2013.01); *F01D 25/183* (2013.01); *F02C 3/04* (2013.01); *F05D 2240/122* (2013.01); *F05D 2240/127* (2013.01); *F05D 2240/50* (2013.01); *F05D 2260/98* (2013.01)
(58) Field of Classification Search
  CPC ...... F01D 25/30; F02C 7/06; F05D 2240/122; F05D 2240/50; F05D 260/98
  See application file for complete search history.

(56) References Cited

FOREIGN PATENT DOCUMENTS

| | | |
|---|---|---|
| JP | 2008-31871 A | 2/2008 |
| JP | 2015-200211 A | 11/2015 |

\* cited by examiner

GAS TURBINE ENGINE

CROSS REFERENCE TO THE RELATED APPLICATION

This application is a continuation application, under 35 U.S.C. § 111(a), of international application No. PCT/JP2018/022457, filed Jun. 12, 2018, which claims priority to Japanese patent application No. 2017-119377, filed Jun. 19, 2017, the entire disclosures of all of which are herein incorporated by reference as a part of this application.

BACKGROUND OF THE INVENTION

Field of the Invention

The present invention relates to a gas turbine engine, in particular, to an oil drain structure of a gas turbine engine.

Description of Related Art

As a structure of an exhaust diffuser for discharging exhaust from a turbine in a gas turbine engine, a double structure including sheet-like outer and inner tubes is generally employed. The outer and inner tubes forming the exhaust diffuser are connected by struts extending in a radial direction (for example, Patent Document 1).

Such a gas turbine engine having the struts as mentioned above also includes oil passages (oil supply passage and oil drain passage) for a rotor-supporting bearing located on an inner diameter side of the exhaust diffuser, the oil passages extending so as to pass through the inner space of the struts. Thus, the gas turbine engine as a whole can be made compact by effectively using the space within the gas turbine engine.

RELATED DOCUMENT

Patent Document

[Patent Document 1] JP Laid-open Patent Publication No. 2015-200211

SUMMARY OF THE INVENTION

Since such struts provided so as to pass through the exhaust diffuser cause pressure loss of the exhaust, it is preferable to make the struts as narrow as possible in order to improve efficiency of the gas turbine engine. For this purpose, it is necessary to make an oil supply passage and an oil drain passage extending through the struts to have a smaller diameter. Where the oil drain passage is simply made to have a smaller dimeter, however, it will deteriorate oil drainage from a bearing chamber.

In order to solve the above problem, an object of the present invention is to improve oil drainage from a bearing chamber in a gas turbine engine having a structure in which an oil supply passage and an oil drain passage for a bearing pass through inner space of struts, so that the oil drain passage can be made to have a smaller dimeter, and to thereby make the struts to have a smaller dimeter so as to improve efficiency of the gas turbine engine.

In order to achieve the object, a gas turbine engine according to the present invention includes:
a turbine;
a bearing configured to rotatably support a rotor of the turbine;
an exhaust diffuser connected to a downstream end of the turbine, the exhaust diffuser including an inner tube and an outer tube such that the inner tube and the outer tube form therebetween an exhaust passage having an annular shape;
a bearing chamber formed radially inside the inner tube and configured to accommodate the bearing;
a plurality of hollow struts extending across the exhaust passage and connecting the inner tube and the outer tube;
an oil introduction passage extending through one of the plurality of struts and configured to introduce oil to be supplied to the bearing chamber;
an oil drain passage extending through one of the plurality of struts and configured to drain the oil from an oil drain inlet opened on a bottom surface of the bearing chamber; and an oil discharge passage configured to discharge a portion of the oil having passed through the oil introduction passage toward the oil drain inlet.

According to this configuration, oil discharge from the oil discharge passage into the oil drain passage provides ejector effect in the region of the oil drain inlet of the oil drain passage so as to improve oil drainage from the bearing chamber. That is, since provision of the oil discharge passage makes it possible to make the oil drain passage to have a smaller diameter without deteriorating oil drainage, the struts can be made compact. Thus, pressure loss in the exhaust passage is suppressed so as to enhance efficiency of the gas turbine engine.

In one embodiment of the present invention, the oil discharge passage may be configured to discharge the oil from an inside of the bearing chamber toward the oil drain inlet. According to this configuration, since oil discharge from the oil discharge passage toward the oil drain inlet is performed from a position closer to the oil drain inlet, oil drainage is further improved.

In one embodiment of the present invention, the oil discharge passage may branch off at a position in the oil introduction passage, radially inside the strut. According to this configuration, since the oil discharge passage branches off at a position radially inside the strut, i.e., a position closer to the bearing chamber, it is possible to improve oil drainage while suppressing increase in complexity or size of the oil supply/drain structure as a whole.

In one embodiment of the present invention, the gas turbine engine may include an upper oil supply passage branching off from the oil introduction passage and configured to supply the oil from above the rotor into the bearing chamber and a lower oil supply passage branching off from the oil introduction passage and configured to supply the oil from below the rotor into the bearing chamber. According to this configuration, the oil supply passages disposed above and below make it possible to supply the oil to the bearing chamber uniformly in the circumferential direction. Moreover, the oil supply passages and the oil discharge passage provided as separate passages make it possible to supply the oil uniformly in the circumferential direction as well as to improve oil drainage.

In one embodiment of the present invention, the rotor may have a rear end located forward with respect to an axial position of the oil introduction passage, and the oil discharge passage may extend along an axis of the oil introduction passage. This configuration makes it possible to simplify the structure from the oil introduction passage to the oil discharge passage.

In one embodiment of the present invention, the oil introduction passage, the oil discharge passage and the oil drain passage may extend in a vertical direction and be arranged concentrically with each other. This configuration makes it possible to use gravity to effectively discharge oil from the oil introduction passage to the oil drain passage via the oil discharge passage, and to provide higher ejector effect.

In one embodiment of the present invention, the rotor may have a rear end located rearward with respect to an axial position of the oil introduction passage, and the oil discharge passage may extend so as to bypass the rotor. This configuration makes it possible to provide an oil discharge passage so as to improve oil drainage in a gas turbine engine having a structure in which a rotor conventionally has its rear end located rearward with respect to an axial position of an oil introduction passage, while minimizing change in the conventional structure.

In one embodiment of the present invention, the rotor may have a rotor cover that covers the rear end of the rotor, and at least a part of the oil discharge passage may be formed inside the rotor cover. This configuration makes it possible to provide the oil discharge passage by making use of the rotor cover in the gas turbine engine having a structure including the rotor cover so as to improve oil drainage while suppressing increase in the number of components.

In one embodiment of the present invention, the gas turbine engine may include an upper oil supply passage branching off from the oil introduction passage and configured to supply the oil from above the rotor into the bearing chamber and a lower oil supply passage branching off from the oil introduction passage and configured to supply the oil from below the rotor into the bearing chamber, wherein the oil discharge passage may be provided so as to branch from the lower oil supply passage. According to this configuration, oil can be introduced to the oil discharge passage utilizing the lower oil supply passage in the gas turbine engine including the lower oil supply passage so as to improve oil drainage, while suppressing increase in complexity or size of the oil supply/drain structure as a whole.

In one embodiment of the present invention, the oil discharge passage may have a downstream end portion formed with an accelerating part configured to accelerate the oil. Specifically, for example, the accelerating part may have a shape with a gradually reduced diameter from an upstream side toward a downstream side, or the accelerating part may be formed such that the accelerating part has a smaller channel cross-sectional area than that on an upstream side of the accelerating part and has a longer channel perimeter in the cross section than that on the upstream side of the accelerating part. Such a configuration of the oil discharge passage makes it possible to provide higher ejector effect, and thereby to further improve oil drainage.

In one embodiment of the present invention, the oil drain passage may have an upstream end portion formed with a throat part. Such a configuration of the oil drain passage makes it possible to provide higher ejector effect, and thereby to further improve oil drainage.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

Hereinafter, embodiments of the present invention will be described with reference to the drawings, but the present invention should not be construed as being limited to the embodiments.

Figure 1:
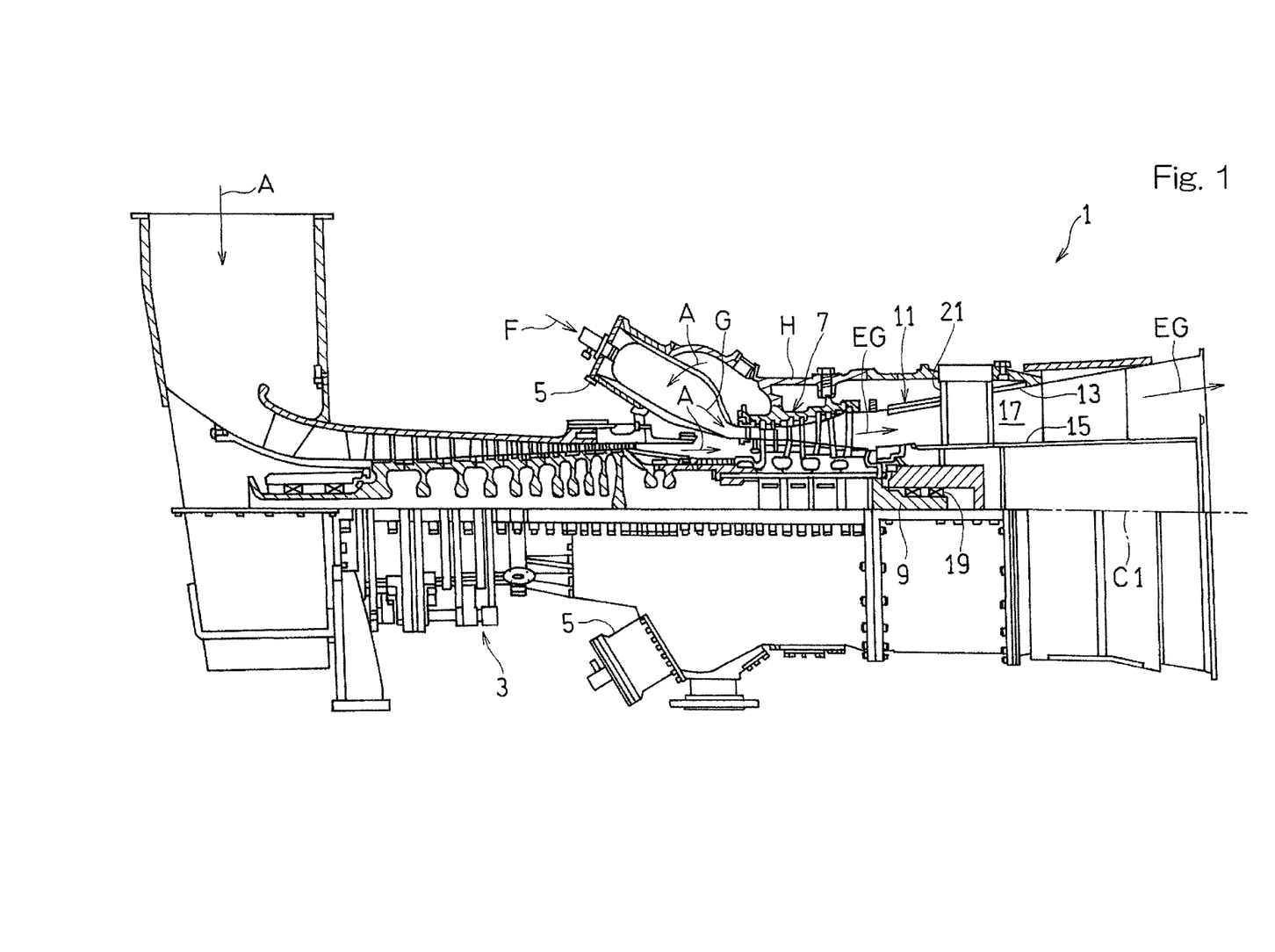
FIG. 1 is a partially-broken side view of a gas turbine engine according to a first embodiment of the present invention.

FIG. 1 is a partially-broken side view of a gas turbine engine (hereinafter, simply referred to as "gas turbine") according to a first embodiment of the present invention. The gas turbine 1 is configured to compress air A using a compressor 3, introduce the air to a combustor 5, inject fuel F into the combustor 5 to combust the fuel with the compressed air A, and rotatably drive a turbine 7 using high-temperature and high-pressure combustion gas G obtained thereby. The turbine 7 is configured to drive a load (not illustrated), such as, for example, a generator, connected through a rotor 9. In the following description, a side of the compressor 3 in an axial direction of the gas turbine 1 is referred to as "front" or "forward," and a side of the turbine 7 is referred to as "rear" or "rearward." Also, when a term "axis" or "axial" is simply recited, it refers to an axis C1 of the gas turbine. Similarly, when terms "radial direction" or "radially" and "circumferential direction" or "circumferentially" are simply recited, they refer to a radial direction and a circumferential direction, respectively, of the gas turbine and components arranged concentrically with the gas turbine.

The turbine 7 has an outlet connected with an exhaust diffuser 11 configured to discharge exhaust gas EG from the turbine 7 to the outside. The exhaust diffuser 11 formed by an outer tube 13 and an inner tube 15 arranged concentrically with each other. That is, the outer tube 13 and the inner tube 15 define therebetween an annular space forming an exhaust passage 17 through which the exhaust gas EG passes. The outer tube 13 and the inner tube 15 are casted products made of, for example, a metal material having excellent heat resistance. Methods for manufacturing the outer tube 13 and the inner tube 15 are not limited to casting, and the outer tube 13 and the inner tube 15 may be formed from, for example, a sheet material made of the above-mentioned metal material. The rotor 9 is rotatably supported by a bearing 19 radially inside the exhaust diffuser 11.

Figure 2:
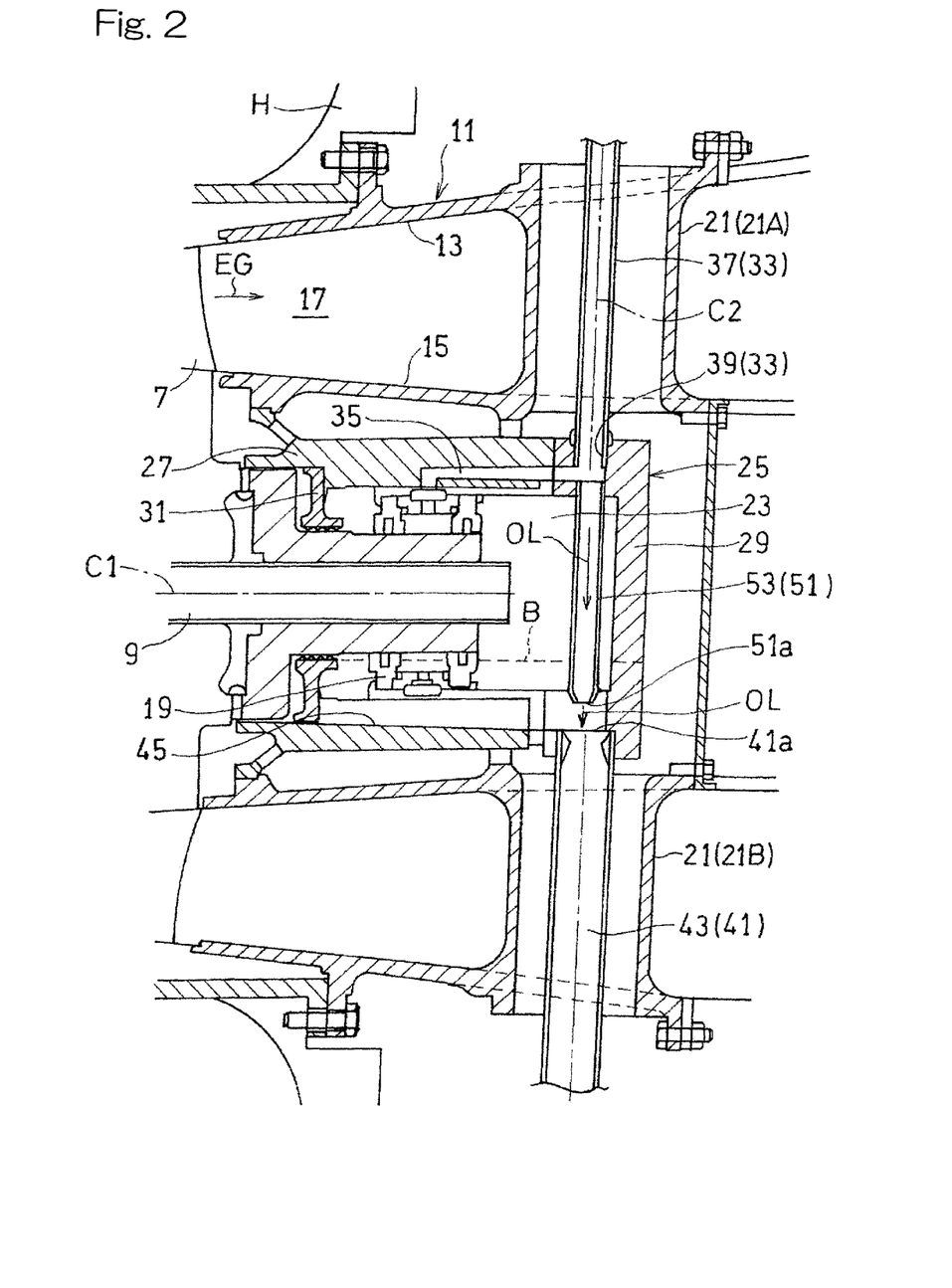
FIG. 2 is an enlarged cross-sectional view of a section around an exhaust diffuser of the gas turbine engine shown in FIG. 1.

As shown in FIG. 2, the outer tube 13 and the inner tube 15 are connected by struts 21. There are a plurality of the struts 21 arranged in a circumferential direction of the exhaust diffuser 11. The struts 21 extend across the exhaust passage 17. In the illustrated example, the struts 21 extend along a radial direction of the exhaust diffuser 11. Alternatively, the struts 21 may extend slantly with respect to the radial direction of the exhaust diffuser 11. Each strut 21 is formed as a hollow member.

A bearing chamber 23 configured to accommodate the bearing 19 is defined radially inside the inner tube 15 of the exhaust diffuser 11. The bearing chamber 23 is defined as a space within a bearing housing 25 having a substantially bottomed cylindrical shape. In the illustrated example, the bearing housing 25 is formed by a bearing support 27 having a substantially cylindrical shape and a rear wall 29 having a disk shape. The bearing support 27 is fixed to an inner peripheral surface of the inner tube 15. The bearing 19 is fixed to an inner peripheral surface of the bearing support 27. That is, the bearing 19 is supported by the inner tube 15 through the bearing support 27. The rear wall 29 is connected with a rear end of the bearing support 27 so as to close the rear part of the bearing chamber 23. The bearing chamber 23 has a front end having an annular seal member 31 configured to slidably seal a gap between an outer peripheral surface of the rotor 9 and the bearing support 27. The seal member 31 is connected with a front end portion of the bearing support 27.

Hereinafter, an oil supply structure and an oil drain structure for oil OL to be supplied to the bearing chamber 23 will be described. An oil supply system for supplying oil to the bearing chamber 23 includes an oil introduction passage 33 configured to introduce the oil OL into the bearing support 27 from outside of a housing H of the gas turbine 1, and an oil supply passage 35 branching off from the oil introduction passage 33 and configured to supply the oil OL to the bearing chamber 23. The oil introduction passage 33 extends through the one strut 21 of the plurality of struts 21. In the following description, the strut 21 through which the oil introduction passage 33 passes may also be referred to as "oil introduction strut 21A" for convenience.

Specifically, the part of the oil introduction passage 33 which passes through said one strut 21 of the plurality of struts 21 is formed by an oil introduction conduit 37 having a pipe shape. A part of an outer peripheral wall of the bearing housing 25 which is located on an inner diameter side of the strut 21 is formed with an oil introduction cavity 39 that is a most-downstream part of the oil introduction passage 33. The oil introduction cavity 39 is formed so as to recess radially inwardly from the outer peripheral surface of the bearing support 27. The oil introduction cavity 39 is connected with a downstream end portion (i.e., an inner-diameter-side end portion) of the oil introduction conduit 37. Thus, the oil introduction cavity 39 of the bearing support 27 forms the most-downstream part of the oil introduction passage 33.

An oil drain system for draining oil from the bearing chamber 23 includes an oil drain passage 41 configured to drain the oil OL within the bearing chamber 23 from the bearing chamber 23 to the outside of the housing H of the gas turbine 1. The oil drain passage 41 is formed by an oil drain conduit 43 having a pipe shape. The oil drain passage 41 is provided such that its oil drain inlet 41a opens to a bottom surface 45 of the bearing chamber 23. More specifically, the bottom surface 45 of the bearing chamber 23 is formed on an inner peripheral part in a lower section of the bearing housing 25. In the illustrated example, the bottom surface 45 is formed as a flat surface that inclines generally downward from the bearing 19 side toward the oil drain passage 41 side (rearward in the illustrated example). The bottom surface 45, however, may not necessarily be a flat surface.

In the present embodiment, since the oil is drained by making use of gravity, no driving device such as a pump is provided to drain the oil. However, a driving device such as a pump may be provided in the oil drain system to drain the oil. The oil drain passage 41 extends so as to pass through one strut 21 of the plurality of strut 21. In the following description, the strut 21 through which the oil drain passage 41 passes may also be referred to as "oil drain strut 21B" for convenience.

In the present embodiment, an oil discharge passage 51 is provided between the oil supply system and the oil drain system. The oil discharge passage 51 is configured to discharge a portion of the oil OL having passed through the oil introduction passage 33 toward the oil drain inlet 41a. In the illustrated example, the oil discharge passage 51 is formed by a discharge conduit 53 having a pipe shape. The oil discharge passage 51 branches off at a position in the oil introduction passage 33, radially inside the oil drain strut 21A. In the present embodiment, the oil discharge passage 51 is arranged so as to discharge the oil OL from the inside of the bearing chamber 23 toward the oil drain inlet 41a. That is, at least a discharge port 51a of the oil discharge passage 51 is arranged within the bearing chamber 23.

In the illustrated example, the rotor 9 is arranged such that its rear end is located forward with respect to the position of the oil introduction passage 33 in the direction of the axis C1. The oil discharge passage 51 is provided so as to extend along an axis C2 of the oil introduction passage 33. The discharge port 51a that is an opening at a downstream end of the oil discharge passage 51 is located below the rotor 9. More specifically, the discharge port 51a is located below a lowermost part B of a sliding surface of the seal member 31 and above the oil drain inlet 41a. The position (a position in the vertical direction) of the lowermost part B of the sliding surface of the seal member 31 is an upper limit position of an oil surface of the oil OL accumulated within the bearing chamber 23.

In the present embodiment, both oil introduction passage 33 and oil discharge passage 51 extend in the vertical direction. The discharge conduit 53 forming the oil discharge passage 51 is provided so as to branch off from the downstream end of the oil introduction cavity 39 (that is, connected to the downstream end of the oil introduction cavity 39), and the oil discharge passage 51 is arranged concentrically with the oil introduction passage 33. Such a configuration makes it possible to simplify the structure from the oil introduction passage 33 to the oil discharge passage 51. Additionally, the oil drain conduit 43 also extends in the vertical direction and is arranged concentrically with the oil introduction passage 33 and the oil discharge passage 51. That is, the discharge port 51a of the oil discharge passage 51 and the oil drain inlet 41a of the oil drain passage 41 are arranged so as to share the same axis C2.

Figure 3:
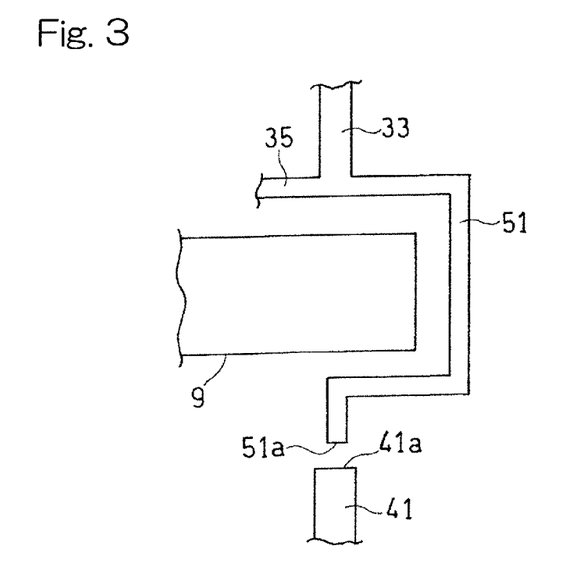
FIG. 3 is a schematic cross-sectional view showing a variant of an oil discharge passage disposed in the gas turbine engine shown in FIG. 2.
Figure 4:
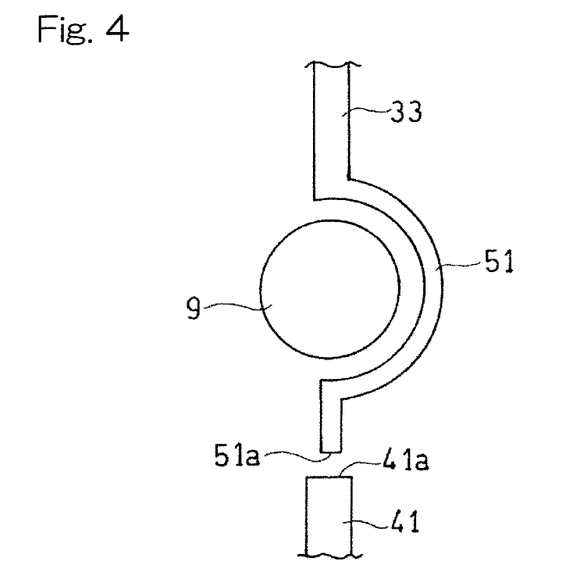
FIG. 4 is a schematic front view showing another variant of the oil discharge passage disposed in the gas turbine engine shown in FIG. 2.

The rotor 9 may have its rear end located rearward with respect to the position of the oil introduction passage 33 in the direction of the axis C1. In that case, the oil discharge passage 51 may be provided so as to bypass the rotor 9 such that the discharge port 51a is located above the oil drain inlet 41a. In that case, for example, as shown in FIG. 3, the oil discharge passage 51 may be provided so as to bypass the rotor 9 in the direction of the axis C1, i.e., so as to pass further rearward with respect to the rear end of the rotor 9. Alternatively, as shown in FIG. 4, the oil discharge passage 51 may be provided so as to bypass the rotor 9 in the radial direction. In the illustrated example, the oil discharge passage 51 bypasses the rotor 9 in such a way that the oil discharge passage 51 curves along the shape of the outer peripheral surface of the rotor 9 (in a C shape). It should be noted that the configuration of the oil discharge passage 51 that bypasses the rotor 9 in the radial direction is not limited to this example.

Figure 5:
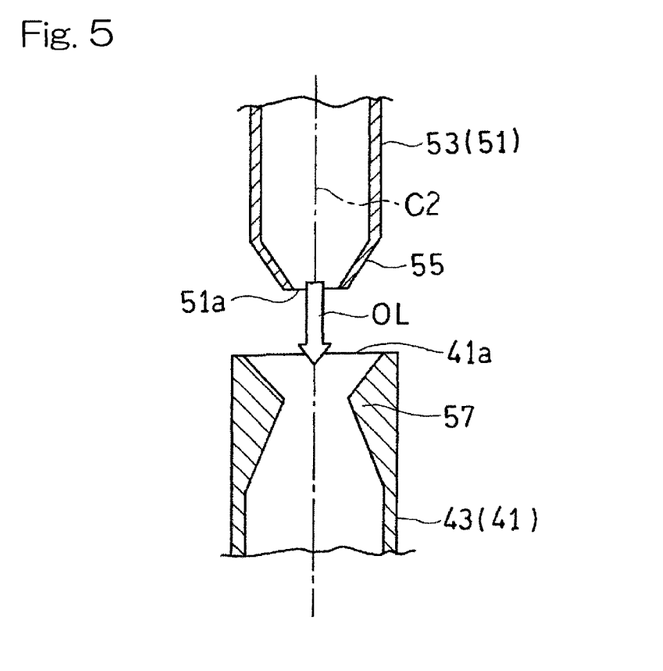
FIG. 5 is a schematic cross-sectional view of the oil discharge passage and oil drain passage disposed in the gas turbine engine shown in FIG. 2.
Figure 6:
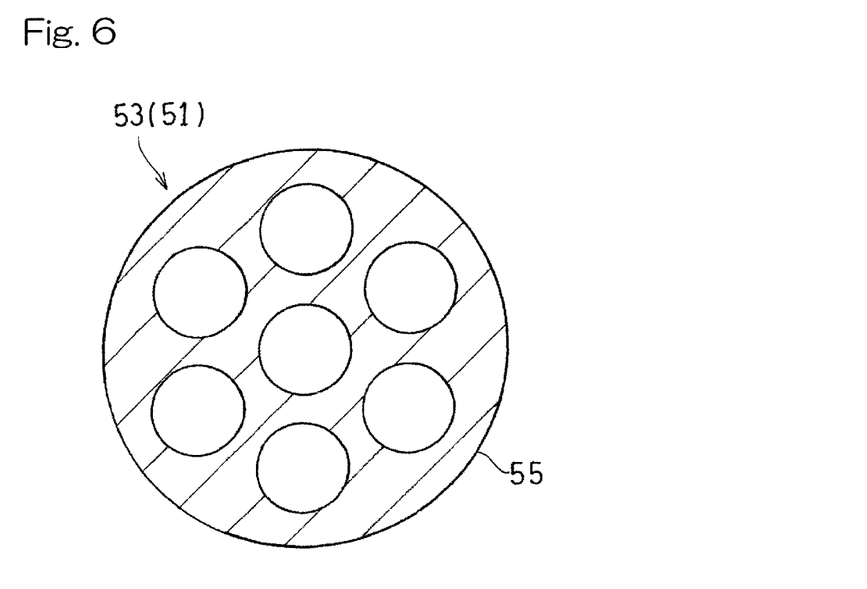
FIG. 6 is a schematic cross-sectional view showing a variant of an accelerating part of the oil discharge passage shown in FIG. 5.
Figure 7:
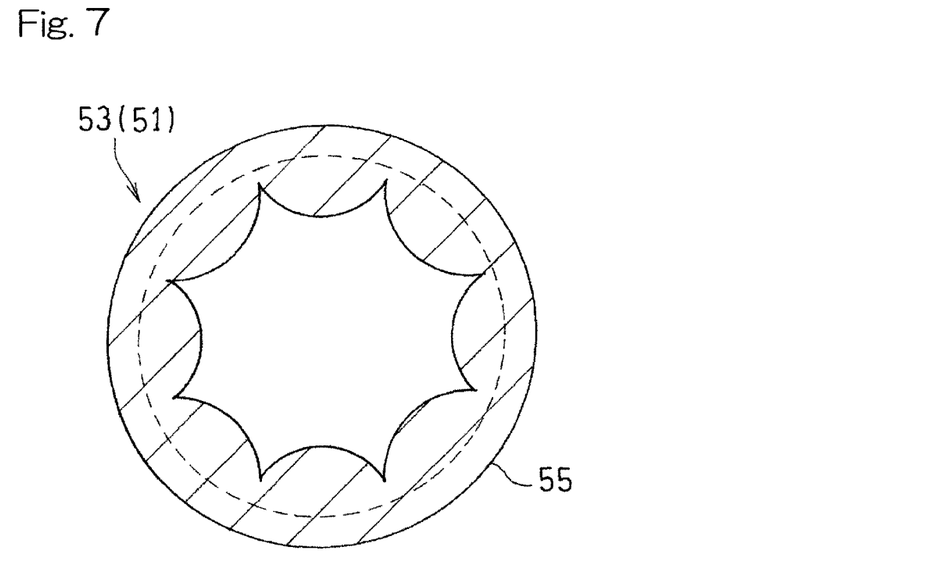
FIG. 7 is a schematic cross-sectional view showing another variant of the accelerating part of the oil discharge passage shown in FIG. 5.

As shown in FIG. 5, in the present embodiment, the downstream end portion of the oil discharge passage 51 is formed with an accelerating part 55 configured to accelerate the oil OL. The expression "accelerate the oil" used herein means that the structure of the accelerating part 55 itself causes the oil OL to accelerate beyond the acceleration under the influence of gravity. In the illustrated example, the accelerating part 55 has a shape with a gradually reduced diameter from an upstream side toward a downstream side. The configuration of the accelerating part 55, however, is not limited to the example of FIG. 5 as long as the accelerating part is capable of accelerating the oil OL toward the discharge port 51a. For example, the accelerating part 55 may be formed such that the accelerating part has a smaller channel cross-sectional area than that of the upstream side of the accelerating part 55 and has a longer channel perimeter in the cross section than that of the upstream side of the accelerating part 55. More specifically, the accelerating part 55 may have, for example, a plurality of through holes as shown in FIG. 6, or a cross section having a petal shape as shown in FIG. 7.

Thus, the accelerating part 55 provided at the downstream end portion of the oil discharge passage 51 makes it possible to provide high ejector effect in the region of the oil drain inlet 41a of the oil drain passage 41 so as to improve oil drainage from bearing chamber 23.

As shown in FIG. 5, in the present embodiment, the oil drain passage 41 has an upstream end portion formed with a throat part 57. That is, the upstream end portion of the oil drain passage 41 has a channel cross-sectional area that is made gradually smaller from the oil drain inlet 41a toward the throat part 57 and is expanded from the throat part 57 toward the downstream side thereof. Thus, the throat part 57 provided at the upstream end portion of the oil drain passage 41 makes it possible to provide high ejector effect so as to further improve oil drainage.

Figure 8:
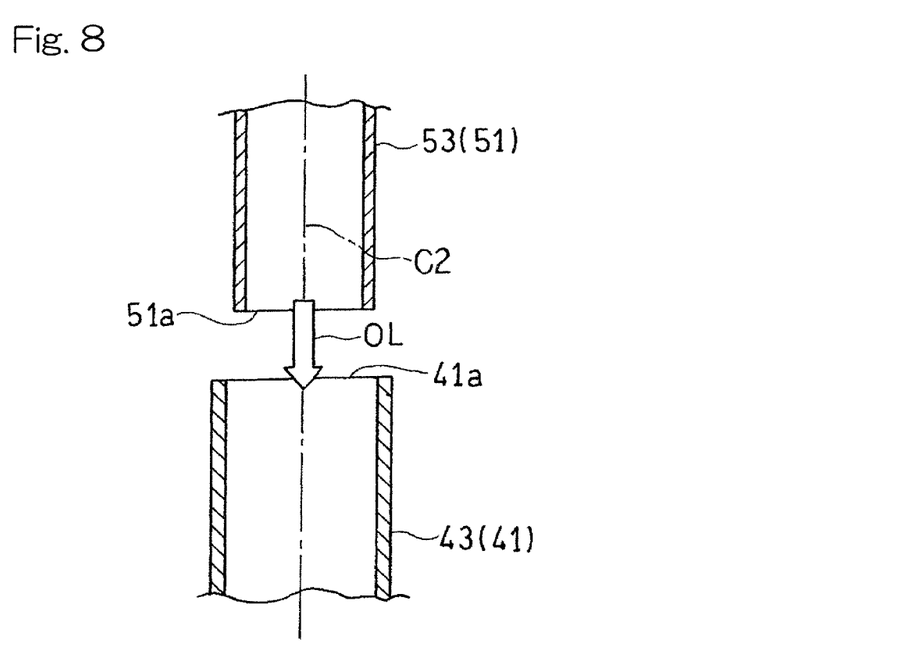
FIG. 8 is a schematic cross-sectional view showing a variant of the oil discharge passage and oil drain passage disposed in the gas turbine engine shown in FIG. 2.

It should be noted that the accelerating part 55 may not be necessarily provided at the downstream end portion of the oil discharge passage 51. As shown in FIG. 8, the downstream end portion of the oil discharge passage 51 may have the same shape and dimension as those of the remaining part of the oil discharge passage 51. That is, the discharge port 51a of the oil discharge passage 51 may be simply formed as a hole or an opening. In addition, the throat part 57 may not be necessarily provided at the upstream end portion of the oil drain passage 41. Even where the accelerating part 55 and the throat part 57 are omitted, the oil OL is discharged from the discharge port 51a toward the oil drain inlet 41a of the oil drain passage 41 so that ejector effect is provided in the region of the oil drain inlet 41a of the oil drain passage 41 so as to improve oil drainage from bearing chamber 23. Although FIG. 8 shows an example in which the accelerating part is not provided in the oil discharge passage 51, and the throat part is not provided in the oil drain passage 41, only one of the accelerating part and the throat part may be omitted.

As described above, the discharge port 51a of the oil discharge passage 51 and the oil drain inlet 41a of the oil drain passage 41 may be provided so as to share the same axis C2 so that high ejector effect can be provided. However, as long as the oil discharge passage 51 is arranged so as to discharge the oil OL toward the oil drain inlet 41a, it is not necessary to arrange the discharge port 51a of the oil discharge passage 51 so as to have the same axis as that of the oil drain inlet 41a.

Furthermore, as explained with reference to FIG. 2, the discharge port 51a of the oil discharge passage 51 is provided preferably within the bearing chamber 23, more preferably below the rotor 9, and even more preferably below the lowermost part B of the sliding surface of the seal member 31, such that the discharge port 51a of the oil discharge passage 51 can be provided adjacent to the oil drain inlet 41a but not within the oil drain passage 41 so as to thereby provide high ejector effect. The position of the discharge port 51a of the oil discharge passage 51, however, is not limited to these positions. For example, the discharge port 51a may be located above the bearing chamber 23, or below the bearing chamber 23, i.e., below the oil drain inlet 41a (within the oil drain passage 41).

According to the gas turbine 1 of the first embodiment as described above, discharge of oil OL from the oil discharge passage 51 shown in FIG. 2 into the oil drain passage 41 provides ejector effect in the region of the oil drain inlet 41a of the oil drain passage 41 so as to improve oil drainage from the bearing chamber 23. That is, provision of the oil discharge passage 51 allows the oil drain passage 41 to be made to have a smaller diameter without deteriorating oil drainage so as to make the struts 21 compact. Thus, the pressure loss in the exhaust passage 17 is suppressed so as to enhance efficiency of the gas turbine 1.

Figure 9:
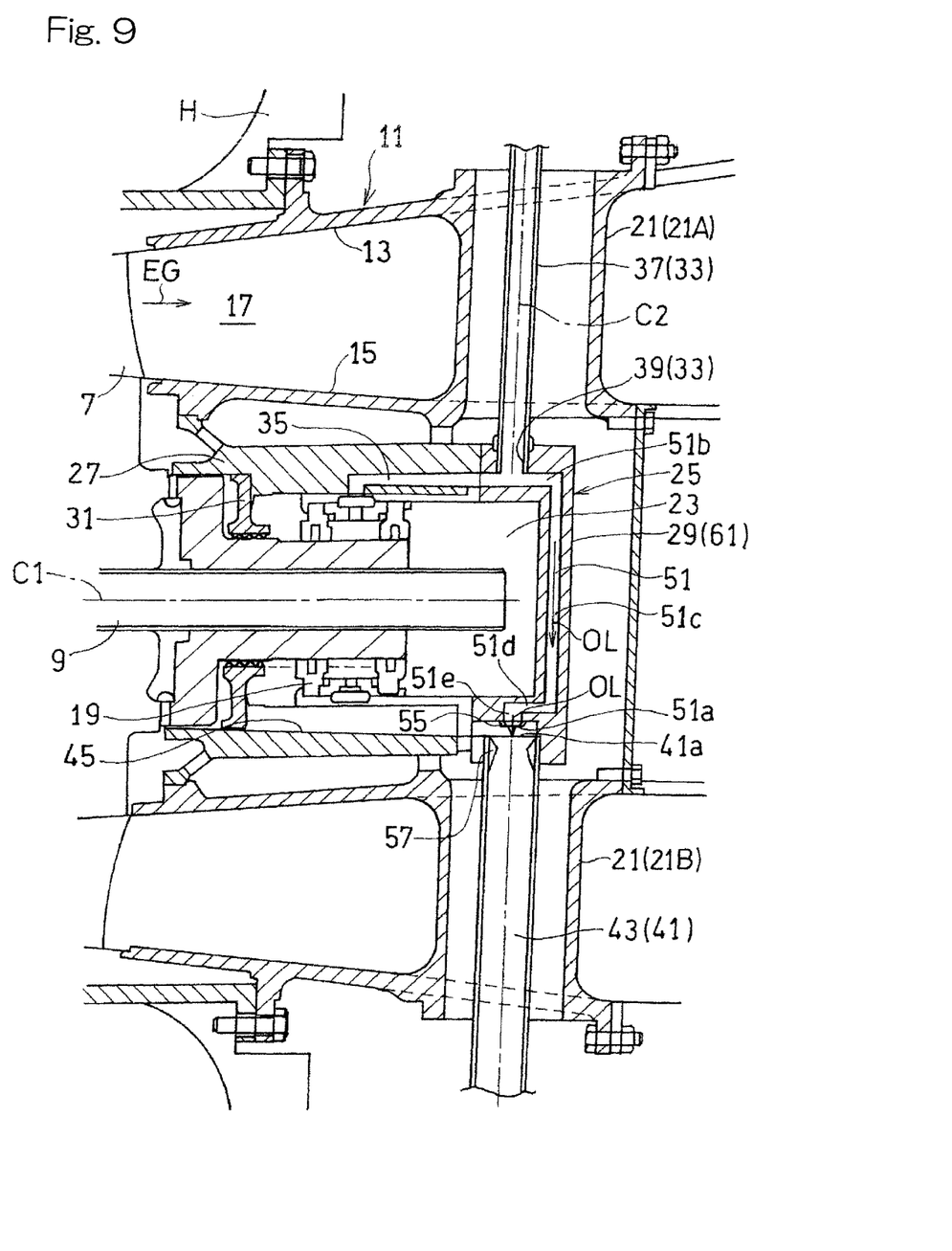
FIG. 9 is an enlarged cross-sectional view of a section around an exhaust diffuser of a gas turbine engine according to a second embodiment of the present invention.

FIG. 9 shows a gas turbine 1 according to a second embodiment of the present invention. This gas turbine 1 shares common points with the first embodiment in that the gas turbine has basic features as the gas turbine 1 including the exhaust diffuser 11 and the struts 21 and includes the oil discharge passage 51, but differs from the first embodiment mainly in specific features of the oil supply system and the oil drain system including the oil discharge passage 51. Hereinafter, explanation is mainly made as to the differences from the first embodiment, and description of the common points is not repeated.

Specifically, in the present embodiment, the rotor 9 has its rear end located rearward with respect to the position of the oil introduction conduit 37 in the direction of the axis C1, and the oil discharge passage 51 extends so as to bypass the rotor 9. More specifically, at least a part of the oil discharge passage 51 is formed inside a rotor cover 61 that covers the rear end of the rotor 9. In the illustrated example, the rear wall 29 forming the bearing housing 25 is used as the rotor cover 61. That is, in this example, the oil discharge passage 51 extends so as to bypass the rotor 9 in the direction of the axis C1.

In the illustrated example, the oil discharge passage 51 includes a branching part 51*b* branching off rearward at the downstream end portion of the oil introduction passage 33; an intermediate part 51*c* extending downward from a rear end of the branching part 51*b* within the rear wall 29 of the bearing housing 25; a downstream part 51*d* extending forward from a downstream end (i.e., lower end) of the intermediate part 51*c*, that is, extending toward the bearing 19 side within the outer peripheral wall of the bearing housing 25; and a discharge part 51*e* extending downward from the downstream part and having a lowermost end formed with a discharge port 51*a*.

In this embodiment, the downstream end portion of the oil discharge passage 51 is likewise formed with an accelerating part 55 configured to accelerate the oil OL. Additionally, the upstream end portion of the oil drain passage 41 is formed with a throat part 57. As described in the first embodiment, however, the accelerating part 55 in the oil discharge passage 51 and/or the throat part 57 in the oil drain passage 41 may likewise be omitted in this embodiment.

Similarly to the first embodiment, in the gas turbine 1 according to this embodiment, discharge of oil OL from the oil discharge passage 51 into the oil drain passage 41 provides ejector effect in the region of the oil drain inlet 41*a* of the oil drain passage 41 so as to improve oil drainage from the bearing chamber 23. As a result, it is possible to make the oil drain passage 41 to have a smaller diameter and to make the struts 21 compact so as to enhance efficiency of the gas turbine 1. Moreover, the gas turbine 1 of this embodiment makes it possible to provide the oil discharge passage 51 in the gas turbine engine having a structure in which the rotor 9 conventionally has its rear end located rearward with respect to the axial position of the oil introduction passage 33 so as to improve oil drainage, while minimizing change in the conventional structure. In particular, this configuration makes it possible to provide the oil discharge passage 51 by making use of the rotor cover 61 in the gas turbine 1 having a structure including the rotor cover 61 so as to improve oil drainage while suppressing increase in the number of components.

Figure 10:
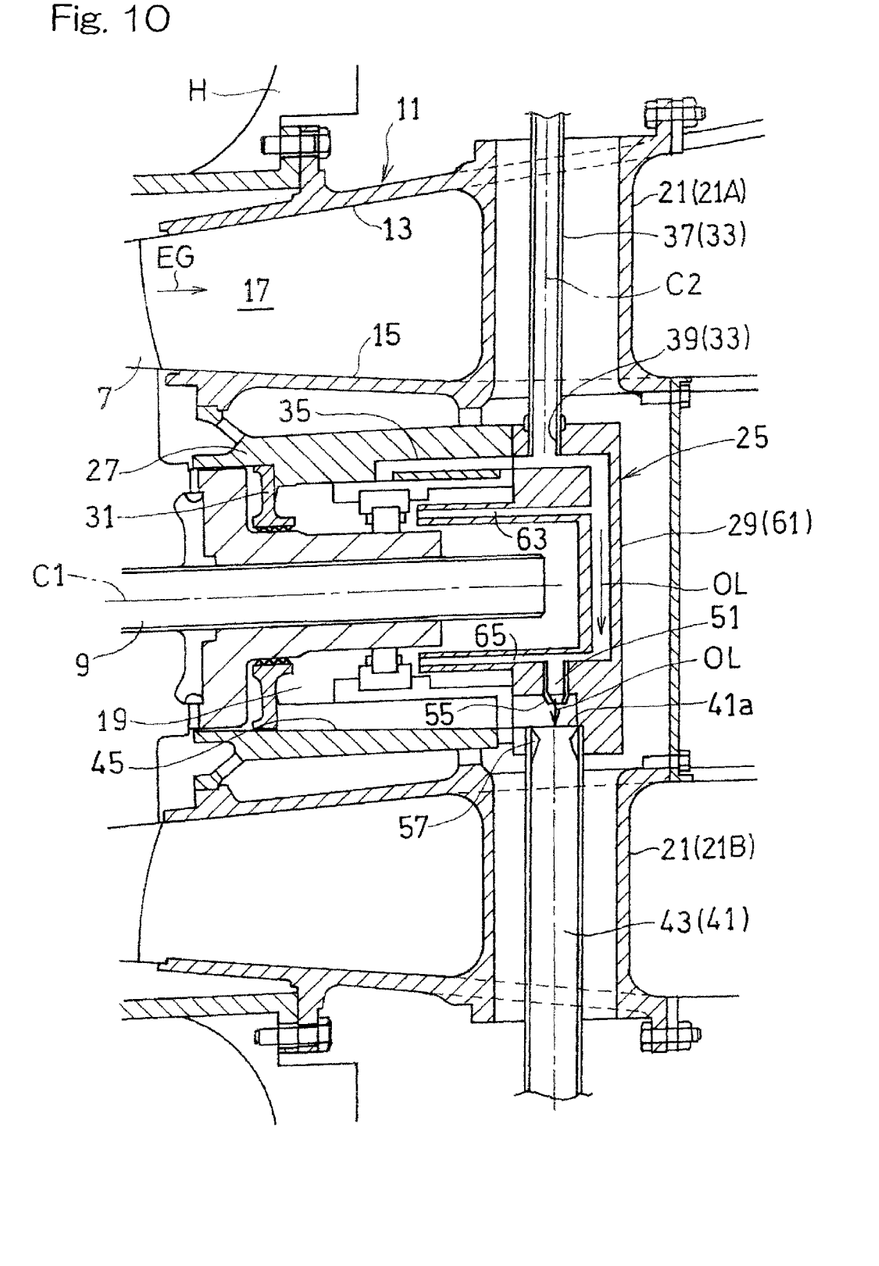
FIG. 10 is an enlarged cross-sectional view of a section around an exhaust diffuser of a gas turbine engine according to a third embodiment of the present invention.

FIG. 10 shows a gas turbine 1 according to a third embodiment of the present invention. This gas turbine 1 shares common points with the first embodiment in that the gas turbine has basic features as the gas turbine 1 including the exhaust diffuser 11 and the struts 21 and includes the oil discharge passage 51, but differs from the first embodiment mainly in specific features of the oil supply system and the oil drain system including the oil discharge passage 51. Hereinafter, explanation is made mainly as to the differences from the first embodiment, and description of the common points is not repeated.

Specifically, in the gas turbine 1 according to this embodiment, the oil supply system includes, besides the oil supply passage (main oil supply passage) 35, an upper oil supply passage 63 branching off from the oil introduction passage 33 and configured to supply the oil OL from above the rotor 9 into the bearing chamber 23 and a lower oil supply passage 65 branching off from the oil introduction passage 33 and configured to supply the oil OL from below the rotor 9 into the bearing chamber 23. Further, the oil discharge passage 51 is provided so as to branch off from the lower oil supply passage 65.

The lower oil supply passage 65 branches off rearward at the downstream end portion of the oil introduction passage 33 and extends so as to bypass the rotor 9, and configured to supply the oil OL to the bearing 19 from a position below the rotor 9 and inside the bearing housing 25. More specifically, the lower oil supply passage 65 includes a branching part 65*a* branching off rearward at the downstream end portion of the oil introduction passage 33; an intermediate part 65*b* extending downward from a rear end of the branching part 65*a* within the rear wall 29 of the bearing housing 25; and a downstream part 65*c* extending forward from a downstream end (i.e., lower end) of the intermediate part 65*b*, that is, toward the bearing 19 within the outer peripheral wall of the bearing housing 25. The oil discharge passage 51 branches off downward at a middle part of the downstream part 65*c* of the lower oil supply passage 65. In the illustrated example, the second upper oil supply passage 63 is provided so as to branch off forward at a middle part of the intermediate part.

In this embodiment, the downstream end portion of the oil discharge passage 51 is likewise formed with an accelerating part 55 configured to accelerate the oil OL. Additionally, the upstream end portion of the oil drain passage 41 is formed with a throat part 57. As described in the first embodiment, however, the accelerating part 55 in the oil discharge passage 51 and/or the throat part 57 in the oil drain passage 41 may likewise be omitted in this embodiment.

Similarly to the first embodiment, in the gas turbine 1 according to this embodiment, discharge of oil OL from the oil discharge passage 51 into the oil drain passage 41 provides ejector effect in the region of the oil drain inlet 41*a* of the oil drain passage 41 so as to improve oil drainage from the bearing chamber 23. As a result, it is possible to make the oil drain passage 41 to have a smaller diameter and to make the struts 21 compact so as to enhance efficiency of the gas turbine 1. Furthermore, according to this embodiment, the oil supply system of the gas turbine 1 including the upper oil supply passage 63 and the lower oil supply passage 65 makes it possible to supply the oil to the bearing 19 uniformly in the circumferential direction. Moreover, the oil discharge passage 51 provided so as to branch off from the lower oil supply passage 65 makes it possible to use the lower oil supply passage 65 to introduce the oil OL into the oil discharge passage 51 such that oil drainage can be improved while suppressing increase in complexity or size of the oil supply/drain structure as a whole.

Figure 11:
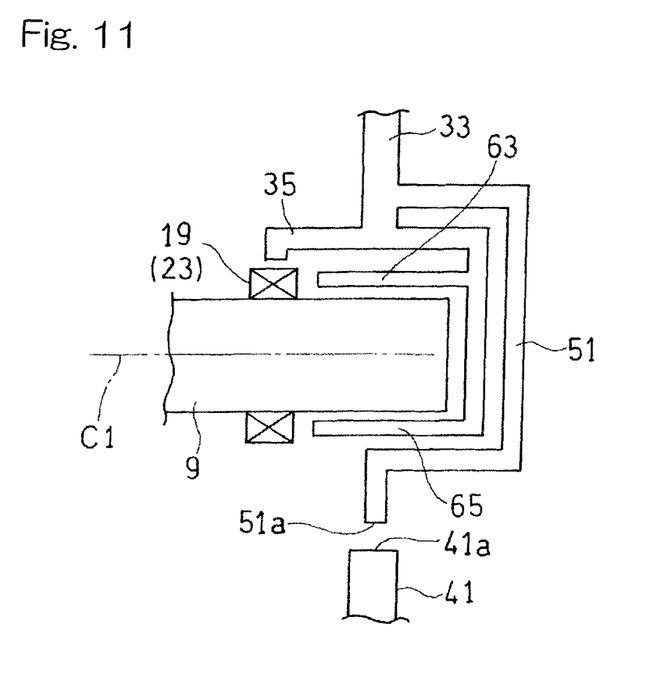
FIG. 11 is a schematic cross-sectional view showing a variant of the gas turbine engine shown in FIG. 10.

It should be noted that even where the oil supply system of the gas turbine 1 includes the upper oil supply passage 63 and the lower oil supply passage 65, the oil discharge passage 51 may branch off from the oil introduction passage 33, as shown in FIG. 11 as a variant of this embodiment. That is, in this example, the oil discharge passage 51 is provided as a separate passage that does not share any part in common with either of the upper oil supply passage 63 and the lower oil supply passage 65. In the illustrated example, the oil discharge passage 51 is formed so as to branch off from the oil introduction passage 33 and bypass the rotor 9 in the direction of the axis C1. However, the configuration of the oil discharge passage 51 that is provided as a separate passage from both of the upper oil supply passage 63 and the lower oil supply passage 65 is not limited to this example. According to this configuration, the respective oil supply passages 63, 65 provided above and below make it possible to supply the oil to the bearing chamber 23 uniformly in the circumferential direction. Furthermore, since the oil supply passages 63, 65 and the oil discharge passage 51 are provided as independent passages, it is possible to supply the oil uniformly in the circumferential direction as well as to improve oil drainage.

Additionally, in the example of FIG. 11, the branching point (connection point) at which the oil discharge passage 51 branches off from the oil introduction passage 33 is located upstream of the branching point at which the upper oil supply passage 63 and the lower oil supply passage 65 branch off from the oil introduction passage 33. This configuration makes it possible to more reliably supply oil uniformly in the circumferential direction, even where the oil discharge passage 51 is provided. However, the positional relation between the branching points at which the respective oil passages branch off from the oil introduction passage 33 is not limited to this example.

It should be noted that although the first and second embodiments employ a sliding bearing as the bearing 19, the bearing 19 may be a rolling bearing. Although the third embodiment employs a rolling bearing as the bearing 19, the bearing 19 may be a sliding bearing. Likewise, although a single bearing 19 is used in these embodiments, a plurality of bearings may be used. In such a case, the bearings 19 may be all sliding bearings, or all rolling bearings, or a combination of these bearings.

With reference to FIG. 2 as a representative example, in any of the above embodiments, the oil introduction strut 21A and the oil drain strut 21B are provided at mutually opposing positions in the circumferential direction, radially outside of the bearing chamber 23. More specifically, the oil introduction strut 21 extends upward in the vertical direction, and the oil drain strut 21 extends downward in the vertical direction. Such a configuration makes it possible to use gravity to effectively supply and drain oil. The positions of the oil supply strut 21A and the oil drain strut 21B, however, are not limited to these examples. Specifically, for example, the struts 21 that are located downstream with respect to the position of the bearing chamber 23 in the direction of axis C1 in the exhaust diffuser 11 may be used as an oil supply strut and an oil drain strut. In addition, the oil supply strut and the oil drain strut may not necessarily be provided as different struts 21. For example, a single strut 21 extending downward in the vertical direction may be used as a common strut for oil supply and oil drainage.

The present invention has been fully described in connection with the preferred embodiments with reference to the drawings. However, various additions, modifications, or deletions may be made without departing from the scope of the invention. Therefore, such modification will also fall within the scope of the invention.

REFERENCE NUMERALS

1 . . . Gas turbine engine
7 . . . Turbine
9 . . . Rotor
11 . . . Exhaust diffuser
13 . . . Outer tube
15 . . . Inner tube
17 . . . Exhaust passage
19 . . . Bearing
21 . . . Strut
23 . . . Bearing chamber
33 . . . Oil introduction passage
41 . . . Oil drain passage
41a . . . Oil drain inlet
45 . . . Bottom surface of the bearing chamber
51 . . . Oil discharge passage
63 . . . Upper oil supply passage
65 . . . Lower oil supply passage
OL . . . Oil

What is claimed is:

1. A gas turbine engine comprising:
   a turbine;
   a bearing configured to rotatably support a rotor of the turbine;
   an exhaust diffuser connected to a downstream end of the turbine, the exhaust diffuser including an inner tube and an outer tube such that the inner tube and the outer tube form therebetween an exhaust passage having an annular shape;
   a bearing chamber formed radially inside the inner tube and configured to accommodate the bearing;
   a plurality of hollow struts extending across the exhaust passage and connecting the inner tube and the outer tube;
   an oil introduction passage extending through first one of the plurality of the hollow struts and configured to introduce a first portion of oil to be supplied to the bearing chamber;
   an oil drain passage extending through second one of the plurality of the hollow struts and configured to drain the oil from an oil drain inlet opened on a bottom surface of the bearing chamber; and
   an oil discharge passage configured to discharge a second a portion of the oil having passed through the oil introduction passage directly to the oil drain inlet.

2. The gas turbine engine as claimed in claim 1, wherein the oil discharge passage is configured to discharge the oil from an inside of the bearing chamber toward the oil drain inlet.

3. The gas turbine engine as claimed in claim 1, wherein the oil discharge passage branches off at a position in the oil introduction passage, radially inside the first one of the plurality of the hollow struts.

4. The gas turbine engine as claimed in claim 3, comprising:
   an upper oil supply passage branching off from the oil introduction passage and configured to supply the oil from above the rotor into the bearing chamber; and
   a lower oil supply passage branching off from the oil introduction passage and configured to supply the oil from below the rotor into the bearing chamber.

5. The gas turbine engine as claimed in claim 3, wherein the rotor has a rear end located forward with respect to an axial position of the oil introduction passage, and the oil discharge passage extends along an axis of the oil introduction passage.

6. The gas turbine engine as claimed in claim 5, wherein the oil introduction passage, the oil discharge passage and the oil drain passage extend in a vertical direction and are arranged concentrically with each other.

7. The gas turbine engine as claimed in claim 3, wherein the rotor has a rear end located rearward with respect to an axial position of the oil introduction passage, and the oil discharge passage extends so as to bypass the rotor.

8. The gas turbine engine as claimed in claim 7, wherein the rotor has a rotor cover that covers the rear end of the rotor, and at least a part of the oil discharge passage is formed inside the rotor cover.

9. The gas turbine engine as claimed in claim 1, further comprising:
   an upper oil supply passage branching off from the oil introduction passage and configured to supply the oil from above the rotor into the bearing chamber; and
   a lower oil supply passage branching off from the oil introduction passage and configured to supply the oil from below the rotor into the bearing chamber, wherein the oil discharge passage is provided so as to branch from the lower oil supply passage.

10. The gas turbine engine as claimed in claim 1, wherein the oil discharge passage has a downstream end portion formed with an accelerating part configured to accelerate the oil.

11. The gas turbine engine as claimed in claim 10, wherein the accelerating part has a shape with a gradually reduced diameter from an upstream side toward a downstream side.

12. The gas turbine engine as claimed in claim 10, wherein the accelerating part is formed such that the accelerating part has a smaller channel cross-sectional area than that of an upstream side of the accelerating part and has a longer channel perimeter in a cross section than that of the upstream side of the accelerating part.

13. The gas turbine engine as claimed in claim 1, wherein the oil drain passage has an upstream end portion formed with a throat part.

\* \* \* \* \*